Figure 1:
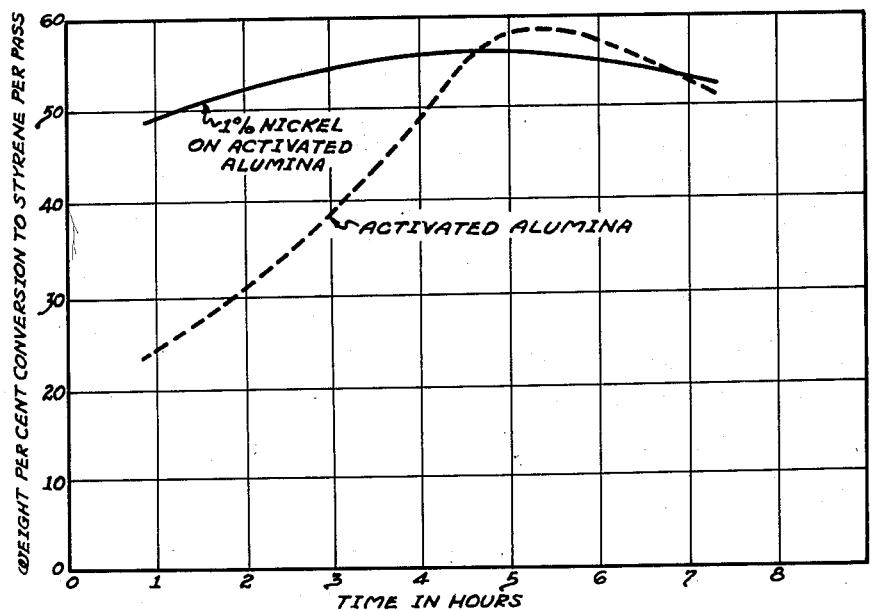

May 17, 1949.  B. B. CORSON ET AL  2,470,092

DEHYDROGENATION PROCESS

Filed Oct. 9, 1944

INVENTORS.
BEN BENNETT CORSON, &
GEORGE ARTHUR WEBB.
BY Edmund G Borden
their ATTORNEY.

Patented May 17, 1949

2,470,092

UNITED STATES PATENT OFFICE 2,470,092

DEHYDROGENATION PROCESS

Ben Bennett Corson and George Arthur Webb, Pittsburgh, Pa., assignors, by mesne assignments, to Koppers Company, Incorporated, Pittsburgh, Pa., a corporation of Delaware Application October 9, 1944, Serial No. 557,914

11 Claims. (Cl. 260—683.3)

The present invention relates to the dehydrogenation of hydrocarbons and to catalysts therefor. More particularly the invention relates to the dehydrogenation of aliphatic hydrocarbons or of aliphatic chains when attached to aromatic hydrocarbons.

It is known to the art that hydrocarbons can be dehydrogenated pyrolytically and catalytically and that the success of a given process depends upon the efficiency by which the dehydrogenation reaction occurs in preference to other side reactions or decomposition reactions. Pyrolytic processes in general require higher operating temperatures to obtain practical dehydrogenating rates, and at these higher temperatures the tendency toward side reactions is increased, resulting in poor operating efficiency. In the so-called "hot vapor" processes, that are modifications of the pyrolytic processes, the hydrocarbon to be dehydrogenated is added directly to a highly superheated vapor such as steam and after an extremely short contact time the mixed vapors are quenched with liquid water, or the like, and are rapidly reduced below temperatures for side cracking reactions.

Catalysts in general provide contact surfaces at which the dehydrogenation reaction can proceed at lower than pyrolytic process temperatures and usually with diminished decomposition or side cracking reactions. The hot vapor processes can be used with catalysts and the economies inherent to operating at a lower temperature and with the reduced pressure effects of a diluent are thus obtained. In this case, however, it is important to choose catalysts which are not affected deleteriously by water and which give practical dehydrogenation rates.

Many dehydrogenation catalysts have been proposed, among the most active being the oxides of metals that are difficultly reducible under the conditions of working such as silica, alumina, magnesia, lime, ceria, chromia, and the like, either alone or in admixture with each other. A particularly good dehydrogenation catalyst results from the admixture of chromia and alumina. It has also been proposed to improve the catalytic activity of these difficultly reducible oxides with metals such as copper, cobalt, and iron. Nickel oxide which can be easily reduced with hydrogen to the metal, has, however, been generally avoided because under the conditions previously employed there have resulted uneconomical decomposition side reactions and carbon formation.

It has now been discovered that under proper operating conditions nickel can be employed to improve difficultly reducible oxide catalysts, and that such nickel impregnated catalysts have improved catalytic activity particularly in the presence of large volumes of water and especially for the dehydrogenation of the aliphatic side chains of alkyl aryl hydrocarbons.

A primary object of the present invention is to provide improved dehydrogenation catalysts, especially of the type comprising difficultly reducible metal oxides.

A further object of the present invention is to provide a catalytic process for dehydrogenating hydrocarbons in the presence of diluent water vapor.

Another object of invention is to provide an improved process for dehydrogenating hydrocarbons such as aliphatic hydrocarbons and the aliphatic chains attached to aromatic hydrocarbons.

Another object of invention is to provide a process for the dehydrogenation of alkyl aryl hydrocarbons to produce alkenyl aryl hydrocarbons.

Still another object of invention is to provide a process for the dehydrogenation of paraffins to olefins.

The invention has for further objects such other improvements and such other operative advantages or results as may be found to obtain in the processes hereinafter described or claimed.

According to the present invention it has been found that dehydrogenation catalysts and especially those catalysts comprising one or more of the oxides of metals that are difficultly reducible under the conditions of working, such as silica, alumina, magnesia, lime, ceria, chromia, and the like, when treated with a small amount of nickel to impregnate the catalyst, give improved results in dehydrogenation reactions, and especially in dehydrogenation reactions where relatively large quantities of water vapor are employed to advantage. The quantity of nickel employed must be less than that producing the known and undesirable cracking reactions and is usually less than 3 percent and preferably about one percent of the total catalyst weight.

To increase the length of the operating cycle with catalysts such as those comprising the difficultly reducible metal oxides, the feed stock is often diluted with water vapor. By the use of such a diluent, the "on stream" life of the catalyst has been increased, probably largely due to the decreased deposition of carbon on the catalyst. In the past, this benefit has been substantially or at least partially offset by the fact that the water vapor exerted an initial poisoning effect on the catalysts, resulting in a prolonged induction period before the catalysts functioned with maximum effectiveness.

The poisoning effect of water on a difficultly reducible oxide catalyst varies with composition of the catalyst, the amount of water used, and the temperature. Small amounts of water do not seriously decrease the initial conversions, or with small amounts of water the length of the inactive period is so short as to be of no practical significance. As the water ratio is increased, the time required for the catalytic activity to reach a maximum is extended. For example, when operating with an activated alumina catalyst at 650° C. and a 2.5:1 mol ratio of water to the to-be-dehydrogenated ethylbenzene, three hours time were required to reach the peak activity. At the same temperature but with a 10:1 mol ratio of water to ethylbenzene, peak activity was not reached until the unit had been on stream for ten hours. However, the higher diluent ratio gave a higher conversion. Further, with the hot vapor processes high diluent ratios are necessary in order to provide sufficient heat for dehydrogenating the hydrocarbon feed.

The induction period for the difficultly reducible oxide catalysts varies with the composition. The following catalyst materials when tested under identical operating conditions for the dehydrogenation of ethylbenzene to styrene had induction periods as follows: activated alumina, 10 hours, magnesia, 15 hours, and dolomite 25 hours.

By the impregnation of a catalyst comprising one or more difficultly reducible metal oxides with less than 3 percent and preferably about one percent of nickel the long induction period or poisoning effect due to the use of water vapor, is substantially and often almost completely eliminated. The nickel-impregnated catalyst functions with maximum effectiveness at times in a matter of minutes after going "on stream," whereas the unimpregnated catalyst usually takes several hours before its peak efficiency is attained. Surprisingly, the increased hydrocarbon conversion obtainable with the nickel impregnated catalyst is not offset by any appreciable increase in carbon deposition on the catalyst, therefore the "on stream" life of a nickel-impregnated catalyst is substantially the same as for an unimpregnated catalyst. It is a very important advantage that the gain in conversion does not carry the penalty of a decreased catalyst life.

The important reduction in the induction period and the elimination of the poisoning effect of water by impregnating difficultly reducible metal oxide catalysts with but one percent by weight of nickel are clearly illustrated in the attached drawing wherein Figure 1 is a diagram showing the weight percent conversion to styrene per pass versus time in hours for a typical conversion of ethylbenzene to styrene over an activated alumina catalyst, with and without nickel impregnation. The water to ethylbenzene molar ratio was 5:1. The impregnated catalyst operated at high efficiency after about a half hour whereas it took about four hours for the unimpregnated catalyst to attain comparable efficiency.

Figure 2:
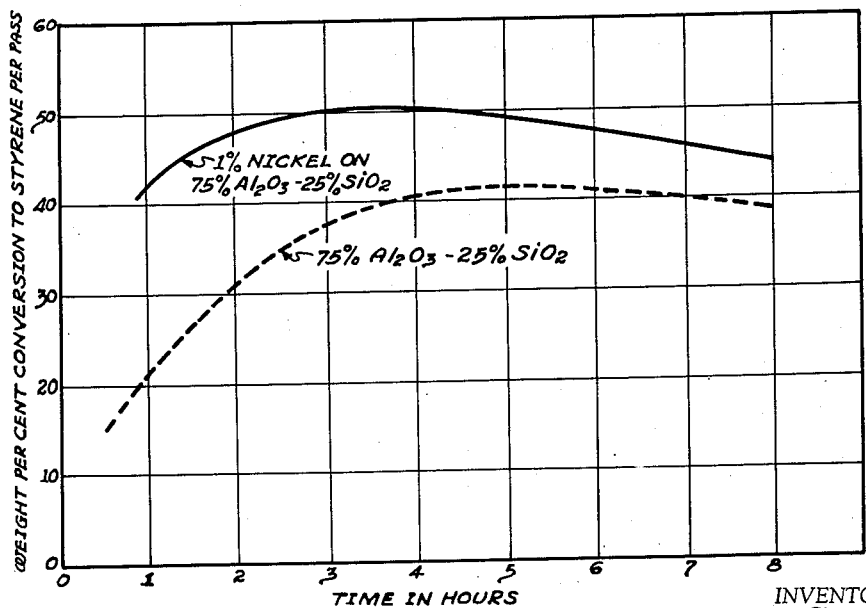

Figure 2 is a diagram similar to Figure 1, where a mixed alumina-silica catalyst was employed, the water to ethylbenzene molar ratio being 10:1. In this conversion the unimpregnated catalyst never attained the conversion efficiency of the nickel-impregnated catalyst. The increased styrene production with nickel impregnation is represented by the area between the two curves. These typical tests will be more fully described in the hereinafter given specific examples.

Ordinarily, because of the aforementioned increased conversion and catalyst life obtainable, it is preferred to operate a nickel-impregnated, difficultly reducible, metal-oxide, dehydrogenation catalyst in the presence of water vapor, especially for conversions in a temperature range of from 500° C. to 750° C. This is especially true for the conversion of ethylbenzene or other alkylated aromatic hydrocarbons to styrene or an analog thereof or for the conversion of a paraffin having at least three carbon atoms in the molecule to an olefin, such as the conversion of isobutane to isobutylene.

The catalyst can be prepared by impregnating a dehydrogenation catalyst, for example, a difficultly reducible metal oxide or mixtures of metal oxides with a nickel salt, for example, nickel nitrate. A sufficient amount of nickel salt solution, for example, is used to provide about one percent deposit by weight of the element nickel on the metal oxide carrier. Upon heating the metal oxide impregnated with the nickel salt in an oxidizing atmosphere the nickel salt is decomposed to form nickel oxide. The metal oxide impregnated with nickel oxide can be used directly in a dehydrogenation chamber and the hydrocarbon passed thereover for treatment. The dehydrogenation of the hydrocarbon will produce sufficient hydrogen to reduce the nickel oxide to metallic nickel, or what is of prime importance, will form a catalyst which is just as effective as a catalyst that has been prepared by the alternative method of first reducing with hydrogen the nickel oxide impregnated metallic oxide.

The nickel can be added during any stage in the preparation of a catalyst. With a porous catalyst the nickel will penetrate the catalyst, while with a denser catalyst the penetration will not be as great. In the following specific examples about one percent nickel has been used with a number of different catalysts in order to compare the results obtainable thereby. Some types of catalysts will operate efficiently with considerably less than a one percent nickel content, whereas others give better results with a little over one percent nickel. In any case, the active surface will probably hold more or less nickel depending largely on the physical condition of the particular catalyst used.

In using the catalyst in the dehydrogenation process, the catalyst is preferably supported in tubes, such as glass, porcelain or metal tubes that may be heated in a furnace to develop the desired temperature in the catalyst bed. The hydrocarbon feed stock is preferably preheated and vaporized at a temperature of about 300° C. to 400° C. before passing it over the heated catalyst. In a hot vapor process the feed stock is vaporized and preheated to about 400° C. before it is mixed with the superheated steam to produce the preferred temperature for contact with the catalyst in an insulated tube.

When the dehydrogenation is carried out at high temperatures at from 500° C. to 750° C. it is generally desirable to quench and quickly condense the products of reaction to avoid any secondary reactions taking place. The preferred product of reaction can be obtained by distilling the condensate. The unconverted feed stock can then be recycled to the dehydrogenation zone.

When the activity of these catalysts has diminished, due to the formation of a carbonaceous deposit upon the surface thereof, the hydrocarbon feed is shut off and the system is purged with an inert gas such as steam, nitrogen, $CO_2$, etc., to remove the volatile combustion matter. The deposited carbonaceous material is then burnt off and the catalyst surface reactivated by simply oxidizing the said deposit by means of air or other oxygen-containing gas. This oxidation is usually carried out at a moderately elevated temperature, or at about the temperature employed in dehydrogenation reactions. The control of the combustion temperature can be obtained by regulating the amount of oxygen in the combustion gas or by other known means. This oxidation restores the catalyst surface to its original condition without loss of catalytic efficiency and the resulting nickel oxide can be again reduced to metallic nickel with hydrogen as previously described.

The following examples illustrate some of the methods for preparing the improved catalyst of the invention and some of the dehydrogenation results obtained by use of the said catalysts. In the following examples the term "conversion per pass" means the percent by weight of the total hydrocarbon feed stock converted to product. The term "ultimate yield" is the percent by weight of reacted hydrocarbon feed stock converted to product.

*Example 1*

A dehydrogenation catalyst was prepared by impregnating a pilled commercial activated alumina with a solution of nickel nitrate. The impregnated alumina after partial dehydration was heated at about 450° C. for two hours in a current of air thus leaving thereon NiO in such amount that the nickel represented about one percent of the dry weight of the alumina. Water and ethylbenzene in a molar ration of 5:1 were vaporized at 350° C. and then passed through a copper-lined tube filled with the nickel impregnated catalyst. The catalyst temperature was 650° C. with one second contact time. The liquid product from an 8-hour run analyzed 53.5 percent styrene.

The activated alumina without nickel impregnation when tested under the same conditions gave a liquid product for an 8-hour run that analyzed only 43.7 percent styrene.

Figure 1 in the drawing was plotted from the results obtained in this test and illustrates the long induction period of about 4.5 hours required before the unimpregnated alumina attained the efficiency of the nickel impregnated alumina. The increased production of styrene is represented by subtracting the small area between the two curves from the large area.

*Example 2*

A dehydrogenation catalyst was prepared by mixing aluminum chloride with silica gel in the correct proportions to give a 75%–25% alumina-silica mixture. The alumina was precipitated with ammonia and the mixture was washed free of chlorides, dried at 100° C., and pilled into ⅛" × ⅛" cylinders. A portion of this pilled catalyst was impregnated with sufficient nickel nitrate to have about one percent nickel on the total weight of alumina silica. The impregnated catalyst was then dried in an oven and finally heated at 600° C. for several hours.

Water and ethylbenzene in a mol ratio of 10:1 were vaporized at 350° C. and then passed through a copper-lined tube filled with the nickel impregnated alumina-silica catalyst. The catalyst temperature was 650° C. with 0.25 second contact time. The liquid product from an 8-hour run was light brown and analyzed 46 percent styrene. The carbon deposit on the catalyst amounted to 1.77 percent of the ethylbenzene charged.

The above alumina-silica catalyst without nickel impregnation when tested under the same conditions gave a liquid product from an 8-hour run that analyzed only 35 percent styrene. The carbon deposit was 1.75 percent of the ethylbenzene charged.

The importance of impregnation with this small amount of nickel is sharply reducing the long induction period caused by the poisoning effect on the catalyst of the water vapor is illustrated in Figure 2 of the attached drawing. The increased styrene production in the first few hours was compared. Analysis of the liquid products after the first two hours of the above runs, with nickel 42% styrene, without nickel 21% styrene. For the second two hour period, with nickel 50% styrene, without nickel 37% styrene. Comparable carbon deposits indicate comparable catalyst life before regeneration.

*Example 3*

The commercial activated alumina catalyst and nickel impregnated alumina catalyst described in Example 1 were compared for dehydrogenating ethyl naphthalene to vinyl naphthalene. Water and ethyl naphthalene in a mol ratio of 10:1 were vaporized at 300° C. and then passed through a copper-lined tube filled with the nickel impregnated alumina catalyst. The catalyst temperature was 650° C. with a one-second contact time. The liquid product from a 30-hour run analyzed 41% vinyl naphthalene. The alumina catalyst without nickel impregnation when tested under the same conditions gave a liquid product from a 30-hour run that analyzed 38% vinyl naphthalene.

*Example 4*

Comparison tests were run with catalysts impregnated with about one percent nickel and unimpregnated catalysts for the dehydrogenation of ethylbenzene to styrene. The test conditions for 4-hour runs and the results obtained have been summarised in the following table:

| Catalyst | Temperature of Catalyst | Contact Time | Water to Ethyl-Benzene Mol Ratio | Average Styrene Conversion/Pass | Ultimate Yield of Styrene |
|---|---|---|---|---|---|
| | ° C. | Seconds | | Per Cent | Per Cent |
| Activated alumina | 650 | 1 | 5:1 | 32 | 72 |
| 1% Nickel on activated alumina | 650 | 1 | 5:1 | 52 | 75 |
| 75% alumina—25% silica | 650 | 0.25 | 10:1 | 31 | 62 |
| 1% Ni on 75% alumina—25% silica | 650 | 0.25 | 10:1 | 46 | 80 |
| 85% alumina—15% chromia | 650 | 1 | 5:1 | 41 | 69 |
| 1% Ni on 85% alumina—15% chromia | 650 | 1 | 5:1 | 49 | 68 |

In terms of styrene production over this 4-hour cycle, the higher conversions per pass due to impregnation with 1% nickel represented increases of 62.5% for the activated alumina, 48.4% for the alumina-silica and 19.5% for the alumina-chromia catalysts.

Example 5

Comparison tests were run with catalysts impregnated with 1% nickel and unimpregnated catalysts for the dehydrogenation of the paraffin isobutane to the olefin isobutylene. All the runs were made at 650° C., with a water to isobutane ratio of 2.5:1 and a contact time of 0.7 second. The results of the tests are given in the following table:

| Catalyst Composition | First Hour Conversion Per Pass |
|---|---|
| | Per Cent |
| 85% Al₂O₃—15% Cr₂O₃ | 13 |
| 1% Ni on 85% Al₂O₃—15% Cr₂O₃ | 24 |
| Activated alumina | 7 |
| 1% Ni on activated alumina | 14 |

Example 6

A catalyst was prepared from magnesite by grinding and screening to give an 8–14 mesh granular particle, and calcining in a current of air at 800° C. for six hours. These granules were then mixed with sufficient nickel nitrate to give about 1% nickel. The mixture was evaporated on a water bath, dried at 100–105° C., and heated at 600°–650° C. to decompose the nickel nitrate to nickel oxide. This catalyst was used to dehydrogenate ethylbenzene to styrene at 650° C., 0.5 second contact time, and with a diluent ratio of 10 mols of steam to one mol of ethylbenzene. For a 160-hour period the overall average styrene production was 35% per pass with an average ultimate yield of about 89%. Over this long operating period the carbon deposition amounted to 0.3% of ethylbenzene feed.

Without the nickel impregnation, a contact time of 0.8 second was required for an average conversion of 36% styrene. Thus the nickel impregnation increased the throughput over the catalyst at the given temperature by 60%.

The advantages of the small amount of added nickel are not restricted to operations in the presence of water for reactions involving the dehydrogenation of the aliphatic side chain of aromatic compounds. In these reactions, the addition of nickel to difficultly reducible metal oxide catalysts increases the catalytic activity as shown by improved conversions at a given temperature without any loss in efficiency. This is illustrated in the following examples:

Example 7

The nickel impregnated catalyst described in Example 1 was employed for ethylbenzene conversion to styrene without a water diluent. The catalyst was charged into a Pyrex glass tube and placed in a reaction furnace. Ethylbenzene was preheated to 300° C. and passed at a rate of 40 cc. per hour over 20 cc. of this catalyst at a temperature of 650° C. The pale yellow liquid condensate had a 45% styrene concentration. The liquid product represented 94.6% of the ethylbenzene charge. The ultimate yield, allowing for the unreacted ethylbenzene was 70%.

The pilled commercial activated alumina without nickel impregnation when used as a catalyst under the same conditions gave a liquid condensate containing 35% styrene, and an ultimate yield of 71%.

Under the same conditions except that the treating temperature was 600° C. rather than 650° C., with the nickel-impregnated almuina catalyst the condensate had a 28% styrene concentration and represented 97.5% of the ethylbenzene charge. With alumina alone the condensate contained only 5% styrene. The nickel impregnated catalyst retained a major portion of its activity at 600° C., whereas the activity of the alumina alone had almost disappeared. Nickel impregnation of a catalyst permits conversion at a lower temperature or gives higher yields than an unimpregnated catalyst at a given optimum temperature.

Example 8

The catalysts of Example 2 were used to dehydrogenate ethylbenzene to styrene, without use of water vapor. Ethylbenzene preheated to 300° C. was passed over the nickel-impregnated catalyst at a liquid hourly space velocity of 4 and a temperature of 650° C. The liquid condensate collected represented 95% of the ethylbenzene charge and contained 28% styrene.

The pilled catalyst comprising 75% Al₂O₃ and 25% SiO₂ without nickel impregnation under the same conditions gave a liquid condensate containing only 12% styrene.

Example 9

Comparison tests were run with commercial activated alumina and alumina impregnated with about one percent nickel for the dehydrogenation of isopropyl benzene to methyl styrene. The runs were made at 650° C. and one second contact time, the weight percent of methyl styrene per pass was 34% with the activated alumina and 45% with the nickel-impregnated activated alumina. The activated alumina referred to herein is a commercial product sold by the Harshaw Chemical Company of Cleveland, Ohio and is obtained by calcining Al(OH)₃ to produce a product consisting essentially of the gamma form of alumina Al₂O₃. This activated alumina is a good dehydrogenating agent.

The actual yields obtained with these catalysts, are a function of the contact time. For example, with a one percent nickel on alumina catalyst the conversion per pass, over a 12-hour operating cycle at 650° C. and 5:1 mol ratio of water as diluent, drops from about 50% to 30% as the contact time is decreased from 1.0 to 0.1 second. However, over this decrease in the contact times, the ultimate yield can be improved by about 10%. Obviously in large scale commercial operations with these catalysts, the contact time would be chosen for optimum conversion. This contact time would probably be in the range of 0.4 to 0.5 second.

The hereinabove described specific examples illustrate some of the dehydrogenation reactions for aliphatic hydrocarbons and aliphatic chains of aromatic hydrocarbons that are importantly improved by impregnating typical dehydrogenation catalysts with less than 3% nickel. In addition to the difficultly reducible oxides, nickel impregnation can be used to promote other dehydrogenation catalysts, as for example, chromium-phosphate, calcium-phosphate, zinc-sulphate, barium-aluminate, calcium-aluminate, magnesium-phosphate, and also the heavy metallates of these metals such as vanadates, molybdates, tungstates, and chromates. Dehydrogenation catalysts impregnated with less than 3% nickel can also be employed to advantage in other typical dehydrogenation reactions, for example, for the dehydrogenation of naphthenes, such as cyclohexane and methyl cyclohexane. Where diluent water is mixed with the feed stock to improve catalyst life, the nickel impregnation reduces the induction period for dehydrogenation catalysts and reactions.

It is known to reduce the cracking activity of nickel in reactions by sulphiding a nickel containing catalyst with hydrogen sulphide, or the like, before use. The cracking activity is reduced where more than about 5% nickel is used. However, in the above described dehydrogenation reactions where about one percent nickel was employed, the results obtained with a sulphided nickel catalyst were poorer than with nickel alone, both with and without water dilution.

The invention as hereinabove set forth is embodied in particular form and manner but may be variously embodied within the scope of the claims hereinafter made.

We claim:

1. In a process for dehydrogenating hydrocarbons over a catalyst in the presence of water vapor, the step for reducing the water vapor induced catalyst induction period, comprising: passing the mixture of hydrocarbon and water vapor in the molecular ratio less than 1:4 into contact with a dehydrogenation catalyst containing at least 75% alumina impregnated with 1% to 3% nickel by weight at a temperature of 500° to 750° C.

2. In a process for dehydrogenating a heated mixture comprising a hydrocarbon and water vapor over a catalyst, the step for more rapidly eliminating the poisoning effect of water vapor on said catalyst, comprising: passing heated hydrocarbon and water vapor mixture in a molecular ratio less than 1:4 over a dehydrogenation catalyst containing at least 75% alumina impregnated with about 1% nickel by weight at a temperature of 500° to 750° C.

3. In a process for dehydrogenating aliphatic hydrocarbons in the presence of water vapor over catalysts, the step for reducing the water vapor induced catalyst induction period, comprising: passing the mixture of aliphatic hydrocarbons and water vapor in a molecular ratio less than 1:4 into contact with a dehydrogenation catalyst containing at least 75% alumina impregnated with 1% to 3% nickel by weight at a temperature of 500° to 750° C.

4. A process for the dehydrogenation of aliphatic hydrocarbons and an aliphatic chain attached to aromatic hydrocarbons, comprising: contacting a said hydrocarbon in the presence of water vapor in a molecular ratio less than 1:4 at a temperature between about 500° C. and 750° C. with a dehydrogenation catalyst comprising at least 75% alumina with another metal oxide difficultly reducible under the said temperature conditions impregnated with one to three percent by weight of nickel.

5. A process for the dehydrogenation of alkyl aryl hydrocarbons having at least two carbon atoms in the alkyl chain to alkenyl aryl hydrocarbons, comprising: contacting a said alkyl aryl hydrocarbon in the presence of water vapor in a molecular ratio less than 1:4 at a temperature between about 500° C. and 750° C. with a dehydrogenation catalyst comprising at least 75% alumina with another metal oxide difficultly reducible under the temperature conditions impregnated with about one percent by weight of nickel.

6. A process for the dehydrogenation of ethylbenzene to styrene, comprising: contacting ethylbenzene in the presence of water vapor in a molecular ratio less than 1:4 at a temperature between about 500° C. and 750° C. with a dehydrogenation catalyst comprising at least 75% alumina with another metal oxide difficultly reducible under the said temperature conditions impregnated with about one percent by weight of nickel.

7. A process for the dehydrogenation of isobutane to isobutylene, comprising: contacting isobutane in the presence of water vapor in a molecular ratio of less than 1:4 at a temperature between about 500° C. and 750° C. with a dehydrogenation catalyst comprising at least 75% alumina with another metal oxide difficultly reducible under the said temperature conditions impregnated with about one percent by weight of nickel.

8. A process for the dehydrogenation of aromatic hydrocarbons with an aliphatic chain attached thereto comprising: contacting a said hydrocarbon in the presence of water vapor at a temperature between about 500° C. and 750° C. with a dehydrogenation catalyst comprising at least 75% alumina with the remainder silica impregnated with one to three percent by weight of nickel.

9. A process for the dehydrogenation of alkyl aryl hydrocarbons having at least two carbon atoms in the alkyl chain to alkenyl aryl hydrocarbons, comprising: contacting a said alkyl aryl hydrocarbon in the presence of water vapor at a temperature between about 500° C. and 750° C. with a dehydrogenation catalyst comprising a mixture containing at least 75% alumina with the remainder chromia impregnated with about one percent by weight of nickel.

10. A process for the dehydrogenation of ethylbenzene to styrene, comprising: contacting ethylbenzene in the presence of water vapor at a temperature between about 500° C. and 750° C. with a dehydrogenation catalyst comprising activated alumina impregnated with about one percent by weight of nickel.

11. A process for dehydrogenation of alkylaryl hydrocarbons comprising contacting said alkylaryl hydrocarbons in the presence of water vapor at a temperature between about 500° and 750° C. with a dehydrogenation catalyst comprising activated alumina impregnated with about 1% by weight of nickel.

BEN BENNETT CORSON.
GEORGE ARTHUR WEBB.

REFERENCES CITED

The following references are of record in the file of this patent:

UNITED STATES PATENTS

| Number | Name | Date |
| --- | --- | --- |
| 1,143,332 | Sulzberger | June 15, 1915 |
| 1,256,032 | Mittasch et al. | Feb. 12, 1918 |
| 1,282,297 | Schwarcman | Oct. 22, 1918 |
| 1,696,645 | Patrick | Dec. 25, 1928 |
| 2,110,833 | Mark et al. | Mar. 8, 1938 |
| 2,274,988 | Matuszak | Mar. 3, 1942 |
| 2,353,509 | Schulze et al. | July 11, 1944 |
| 2,354,892 | Thacker | Aug. 1, 1944 |
| 2,366,531 | Ipatieff et al. | Jan. 2, 1945 |
| 2,370,797 | Kearby | Mar. 6, 1945 |
| 2,370,798 | Kearby | Mar. 6, 1945 |
| 2,383,643 | Fulton et al. | Aug. 28, 1945 |
| 2,395,875 | Kearby | Mar. 5, 1946 |
| 2,402,740 | Doumani et al. | June 25, 1946 |